US 6,711,839 B1

(12) United States Patent
Kawamura et al.

(10) Patent No.: US 6,711,839 B1
(45) Date of Patent: Mar. 30, 2004

(54) TRACTOR WITH A WORKING IMPLEMENT

(75) Inventors: Shoichiro Kawamura, Hannan (JP); Ryoichi Nishi, Kawachinagano (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 09/648,911

(22) Filed: Aug. 25, 2000

(30) Foreign Application Priority Data

Aug. 25, 1999 (JP) .......................................... 11-238573

(51) Int. Cl.$^7$ ............................................... B62D 33/08
(52) U.S. Cl. ..................................... 37/466; 180/89.13
(58) Field of Search ..................... 37/466, 408, 410, 37/443; 180/89.3; 296/190.08

(56) References Cited

U.S. PATENT DOCUMENTS

| | | | | |
|---|---|---|---|---|
| 2,946,373 A | * | 7/1960 | McCanse et al. .............. 155/80 |
| 3,195,913 A | * | 7/1965 | Hallsworth .................... 280/87 |
| 3,223,193 A | * | 12/1965 | Reynolds et al. .............. 180/77 |
| 3,347,558 A | * | 10/1967 | Grimes et al. ................. 280/87 |
| 3,437,373 A | * | 4/1969 | Boston ........................... 296/65 |
| 3,448,820 A | * | 6/1969 | Aiello et al. ................... 180/77 |
| 3,606,047 A | * | 9/1971 | Schaeff ......................... 214/138 |
| 3,612,310 A | * | 10/1971 | Schaeff ......................... 214/138 |
| 3,640,035 A | * | 2/1972 | Butterfield .................... 52/177 |
| 3,841,429 A | * | 10/1974 | Falcone et al. ................ 180/77 |
| 4,059,171 A | * | 11/1977 | Pakosh .......................... 180/77 |
| 4,072,343 A | * | 2/1978 | Meza ............................ 297/93 |
| 4,081,051 A | * | 3/1978 | Logsdon ....................... 180/77 |
| 4,134,617 A | * | 1/1979 | Matsubara .................... 297/345 |
| 4,749,191 A | * | 6/1988 | Gipson et al. ............... 280/164 |
| 5,086,869 A | * | 2/1992 | Newbery et al. ........... 180/329 |
| 5,265,995 A | * | 11/1993 | Beck ............................ 414/694 |
| 6,056,502 A | | 5/2000 | Takemura et al. .......... 414/686 |
| 6,286,897 B1 | * | 9/2001 | Ruhter et al. ............ 296/190.01 |

FOREIGN PATENT DOCUMENTS

JP  H99713  1/1997

* cited by examiner

Primary Examiner—Thomas B. Will
Assistant Examiner—Kristine Florio
(74) Attorney, Agent, or Firm—Webb Ziesenheim Logsdon Orkin & Hanson, P.C.

(57) ABSTRACT

A tractor includes a tractor body (2), a driver's seat disposed on the tractor body, a working implement attached to a rear end of the tractor body, a tractor control station disposed forwardly of the driver's seat, an implement control station disposed rearwardly of the driver's seat, and a position switching mechanism for switching the driver's seat between a forward facing position for allowing a driver seated on the driver's seat to operate the tractor control station, and a rearward facing position for allowing the driver to operate the implement control station. A passage (52) is disposed on the tractor body (2) for allowing the driver to move past the driver's seat (8) between the tractor control station (43) and the implement control station (33).

15 Claims, 5 Drawing Sheets

TRACTOR WITH A WORKING IMPLEMENT

BACKGROUND OF THE INVENTION

1. Field of the Invention

This invention relates to a tractor constructed for attaching a working implement thereto, and more particularly to a tractor with a working implement such as a backhoe attached to the rear of a tractor body.

2. Description of the Related Art

A working vehicle called a TLB (tractor-front loader-backhoe) is known, which has a front loader attached to the front of a tractor and a backhoe attached to the rear (see Japanese Patent Laying-Open Publication H9-9713 and U.S. Pat. No. 6,056,502, for example).

The tractor employed in the TLB includes a driver's seat mounted on a tractor body through a reversing support mechanism to be reversible between a forward facing position and a rearward facing position. Forwardly of the driver's seat is a maneuvering station including a steering wheel and a maneuvering floor. The front loader and backhoe have their own control levers.

When driving the tractor to travel from one location to another or performing an operation with the front loader, the driver's seat is set to the forward facing position so that the driver may operate the steering wheel, control levers, and so on. When performing an operation with the backhoe, the driver's seat is reversed to the rearward facing position so that the driver may operate the control lever of the backhoe.

When, for example, the above tractor is driven to a destination, and then engages in an excavating operation by operating the backhoe, the driver first reverses the driver's seat from the position facing the maneuvering station to the rearward facing position, alights from the tractor to the ground once, walks to a rearward position of the tractor, boards the tractor using steps disposed adjacent the backhoe, and sits on the driver's seat again.

The driver must make such movements because numerous control levers such as a control lever of a hydraulic lift and an auxiliary shift lever of a propelling system lie in a scattered state longitudinally of the tractor body between a maneuvering area and the backhoe, especially around the driver's seat. It is therefore difficult to secure a space around the driver's seat for allowing the driver to move on the tractor body directly from the maneuvering area past the driver's seat toward the backhoe.

Thus, the driver must take a great trouble in moving from the maneuvering area to a backhoe operating area. Working efficiency also is bad since an excavating operation cannot be started immediately upon arrival at a destination. In addition, since the driver must alight from the tractor body once when moving from the maneuvering area to the backhoe operating area, the driver tends to bring mud from the ground to the tractor body. This requires frequent maintenance operations such as cleaning operations.

On the other hand, the reversing support mechanism of the driver's seat is constructed for avoiding an interference between the driver's seat and adjacent control levers. Specifically, the driver's seat is once raised by a raising and lowering linkage or the like, and turned about a vertical axis and then lowered again. Such construction of the reversing support mechanism has drawbacks of being complicated and requiring a troublesome, multistage operation.

SUMMARY OF THE INVENTION

This invention has been made having regard to the state of the art of tractors such as TLBs with a working implement attachable rearwardly of a driver's seat. An object of this invention, therefore, is to allow the driver to move quickly and easily between a maneuvering area forwardly of the driver's seat and an implement operating area for operating a working implement attached to the rear of a tractor body, thereby reducing the driver's trouble and improving working efficiency. Another object of the invention is to prevent mud being brought in by the driver frequently alighting from and boarding the vehicle body.

The above objects are fulfilled, according to this invention, by a tractor comprising a tractor body, a driver's seat disposed on the tractor body, a working implement attached to a rear end of the tractor body, a tractor control station disposed forwardly of the driver's seat, an implement control station disposed rearwardly of the driver's seat, a position switching mechanism for switching the driver's seat between a forward facing position for allowing a driver seated on the driver's seat to operate the tractor control station, and a rearward facing position for allowing the driver to operate the implement control station, and a passage disposed on the tractor body for allowing the driver to move past the driver's seat between the tractor control station and the implement control station.

With this construction, the driver (operator) may move quickly and easily, through the passage formed laterally of the driver's seat, between the tractor control station disposed forwardly of the driver's seat and the implement control station disposed rearwardly of the driver's seat. The trouble involved in such movement is reduced and working efficiency is improved. In addition, this construction minimizes the possibility of bringing mud and the like to the tractor body.

In one preferred embodiment of the invention, the driver's seat is disposed between right and left wheel fenders. A plurality of control levers are disposed in a concentrated way between one of the wheel fenders and the driver's seat. The passage is disposed between the other wheel fender and the driver's seat. Generally, a small tractor has a driver's seat disposed between wheel fenders. The above construction according to this invention makes effective use of the narrow space between the right and left wheel fenders, and secures the passage without difficulty.

In the preferred embodiment of the invention, the driver's seat may be horizontally rotatable about a vertical axis to switch between the forward facing position and the rearward facing position. Then, the driver's seat may be turned with a protruding position of large turning radius moving through the passage. In this way, the driver's seat may be switched quickly and easily without the protruding position interfering with the control levers. This construction does not require a complicated mechanism used in the prior art for raising the driver's seat.

In the preferred embodiment, the passage includes a step member disposed thereon and having an antislipping function, the step member serving as a reinforcing member for the wheel fender disposed laterally of the passage. This construction provides the passage with an antislipping function, and rigidly supports the wheel fender. The step member may be detachably attached to the passage. Then, when the step member is detached from the passage, mud and the like adhering to the step member may be removed therefrom with ease. Further, the step member may be changed easily as necessary.

Other features and advantages of this invention will be apparent from the following description of the embodiment to be taken with reference to the drawings.

DESCRIPTION OF THE PREFERRED EMBODIMENT

An embodiment of this invention will be described hereinafter with reference to the drawings.

Figure 1:
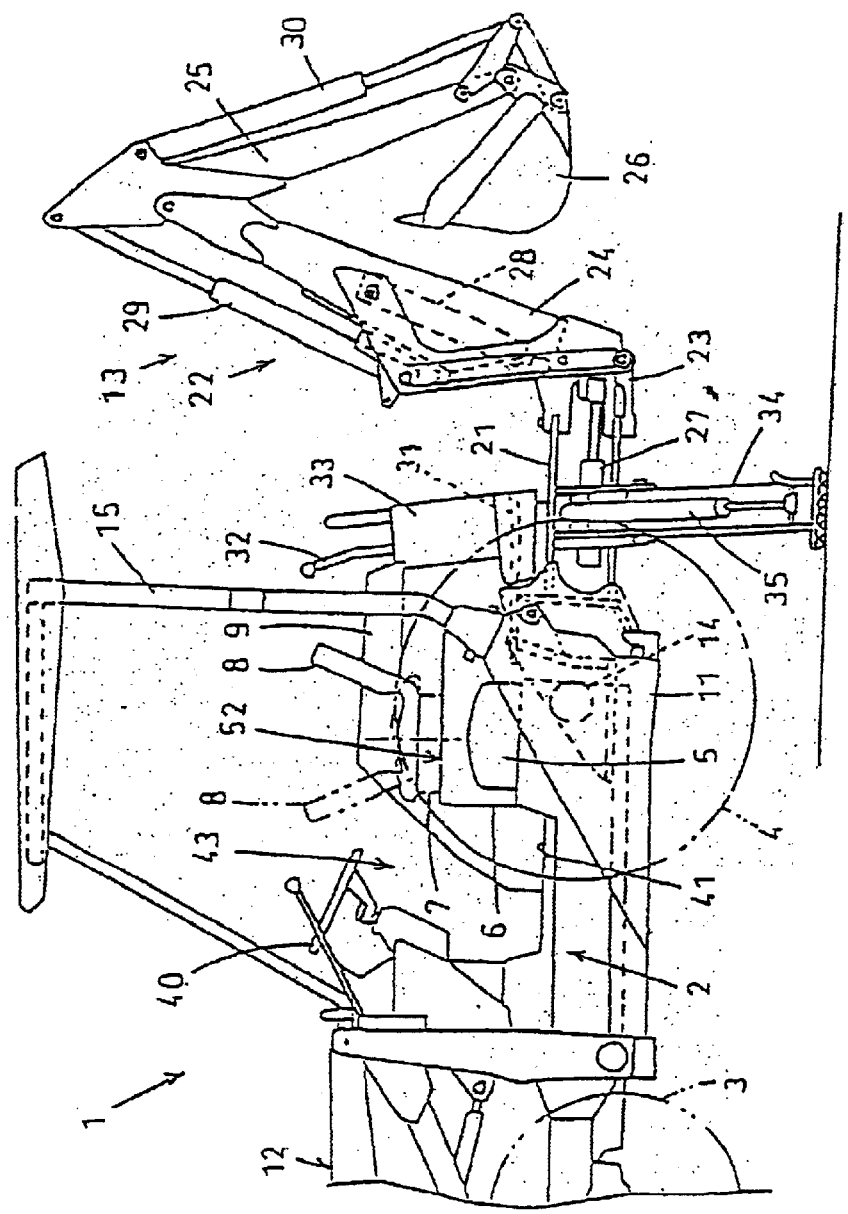
FIG. 1 is a side view of a tractor, shown with a forward end region omitted, according to this invention.

FIG. 1 shows a tractor 1 according to this invention. The tractor 1 includes a tractor body 2 formed of an engine, a transmission case and so on. The tractor body 2 has right and left front wheels 3 and right and left rear wheels 4.

Further, the tractor body 2 has, disposed in upper rear positions thereof, a hydraulic device 5 for raising and lowering a working implement attached to a three-point linkage, and a floor sheet 6 covering an area above the hydraulic device 5. The floor sheet 6 has a driver's seat 8 mounted thereon through a reversing support device 7 to be reversible between a forward facing position and a rearward facing position. Further, the floor seat 6 has wheel fenders 9 fixed to right and left sides thereof by fastening elements such as bolts, for covering forward areas above the rear wheels 4, respectively.

The tractor body 2 has a front loader 12 attached to the front thereof through a mounting frame 11. A backhoe 13 is detachably attached to the rear of tractor body 2 (i.e. a working implement according to this invention) through the same mounting frame 11. The tractor and these implements constitute a working vehicle called a TLB (tractor-front loader-backhoe).

Figure 2:
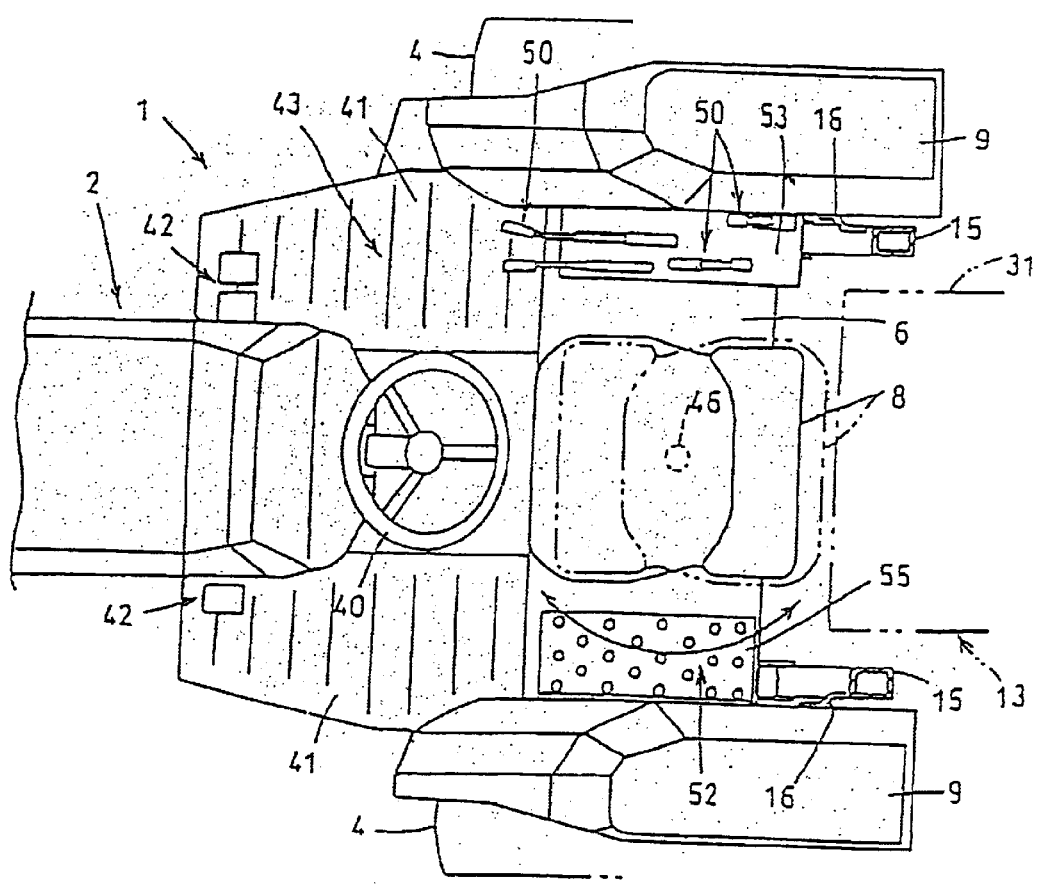
FIG. 2 is a plan view of a rear portion of the tractor shown in FIG. 1.
Figure 3:
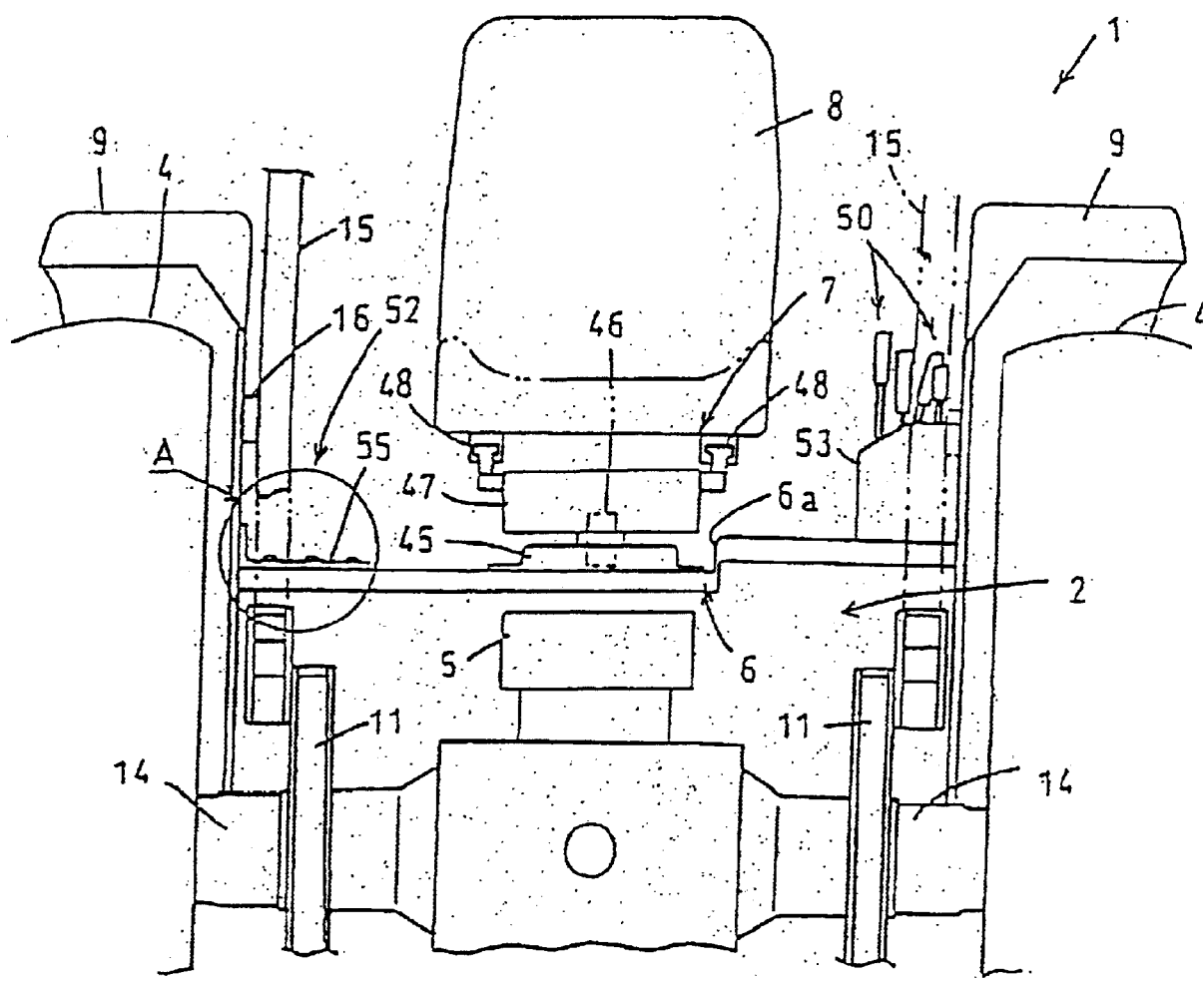
FIG. 3 is a rear view of a driving platform region of the tractor shown in FIG. 1.

The mounting frame 11 has front portions thereof fixed to lateral positions of the tractor body 2, and rear portions connected to rear axle cases 14 projecting laterally outwardly of the transmission case. Lower ends of a safety frame 15 gate-shaped in front view are fixed to upper rear positions of the mounting frame 11. As shown in FIGS. 2 and 3, the safety frame 15 has support pieces 16 extending forward from vertically intermediate positions thereof, and the wheel fenders 9 are connected in rearward positions thereof to the support pieces 16 through connectors such as bolts, respectively. Thus, the wheel fenders 9 are supported also by the safety frame 15.

The backhoe 13 has a base frame 21 separably connected to the rear of mounting frame 11, and an excavator 22 extending rearwardly of the base frame 21. The excavator 22 includes a swing frame 23 supported by the base frame 21 to be pivotable right and left, a boom 24 supported at a proximal end thereof by the swing frame 23 to be vertically pivotable, an arm 25 supported at a proximal end thereof by an upper end of the boom 24 to be pivotable fore and aft, and a bucket 26 supported by a distal end of the arm 25 to be pivotable fore and aft. The swing frame 23, boom 24, arm 25 and bucket 26 are pivotable, respectively, by a swing cylinder 27, a boom cylinder 28, an arm cylinder 29 and a bucket cylinder 30 which are all hydraulic cylinders.

Figure 4:
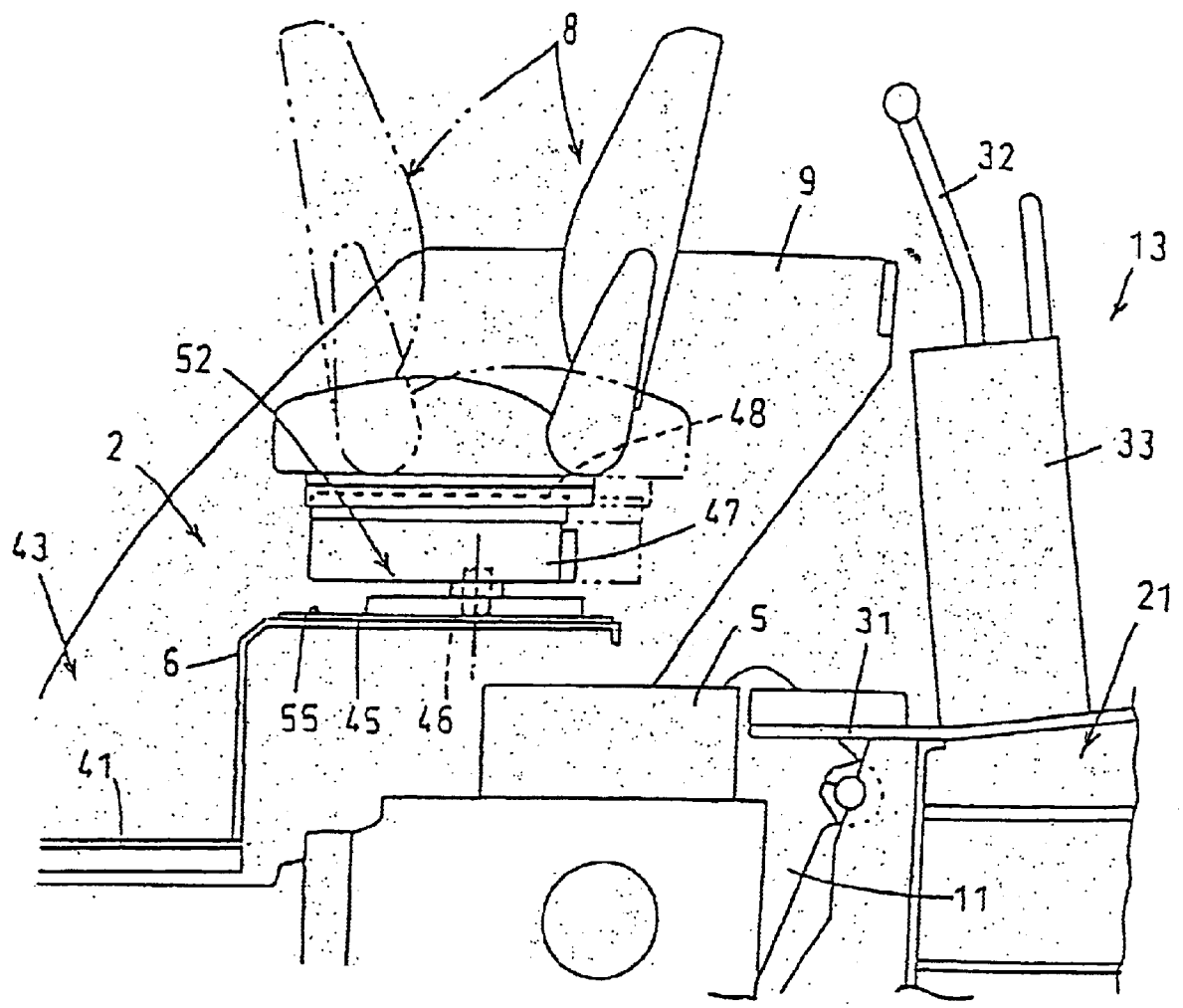
FIG. 4 is a side view of the driving platform region.

As shown in FIG. 4 also, the base frame 21 has a step 31 extending from an upper position thereof forward toward the tractor body 2. The step 31 supports a control box 33 erected thereon and including a control lever 32. Stabilizers 34 are connected to right and left sides of base frame 21 through brackets to be vertically oscillatable by oscillating cylinders 35.

As shown in FIGS. 1 and 2, a maneuvering station 43 is disposed on the tractor body 2 forwardly of the driver's seat 8, which includes a steering wheel 40, a maneuvering floor 41 and brake and accelerator pedals 42. The tractor 1 is driven to make a traveling run by the driver operating the maneuvering station 43.

The reversing support device 7 is disposed in a transversely middle position on the floor sheet 6 between the right and left wheel fenders 9. As shown in FIGS. 3 and 4, the reversing support device 7 includes a base member 45 fixed to the floor sheet 6, and a seat mount 47 pivotably mounted on the base member 45 through a vertical support shaft 46. The driver's seat 8 is supported to be positionally adjustable backward and forward along slide rails 48 arranged on light and left sides of seat mount 47.

The reversing support device 7 includes a locking device (not shown) for setting the driver's seat 8 to the forward facing position and rearward facing position. By releasing the locking device, the seat mount 47 becomes horizontally rotatable relative to the base member 45 to switch the positions of driver's seat 8.

As shown in FIGS. 2 and 3, the upper surface of floor sheet 6 at the right side of driver's seat 8 is elevated by way of a shoulder 6a, and this elevated surface supports a plurality of control levers 50 arranged in a concentrated way and including a control lever for the hydraulic device 5 and an auxiliary shift lever for a propelling system. On the other hand, the floor sheet 6 between the driver's seat 8 and left wheel fender 9 defines a passage 52 for allowing the driver to move fore and aft between the maneuvering floor 41 of maneuvering station 43 and the step 31 of backhoe 13.

The proximal regions of control levers 50 are covered by a cover member 53 defining guide grooves for guiding rocking movements of control levers 50. This cover member 53 is fixed by bolts to the floor sheet 6 as well as the right wheel fender 9. Consequently, the cover member 53 acts also as a reinforcement for the right wheel fender 9.

On the other hand, the passage 52 is formed on the same plane as (i.e. level with) a position where the reversing support device 7 is installed. The passage 52 has a step member 55 applied thereto and having an antislipping function.

Figure 5:
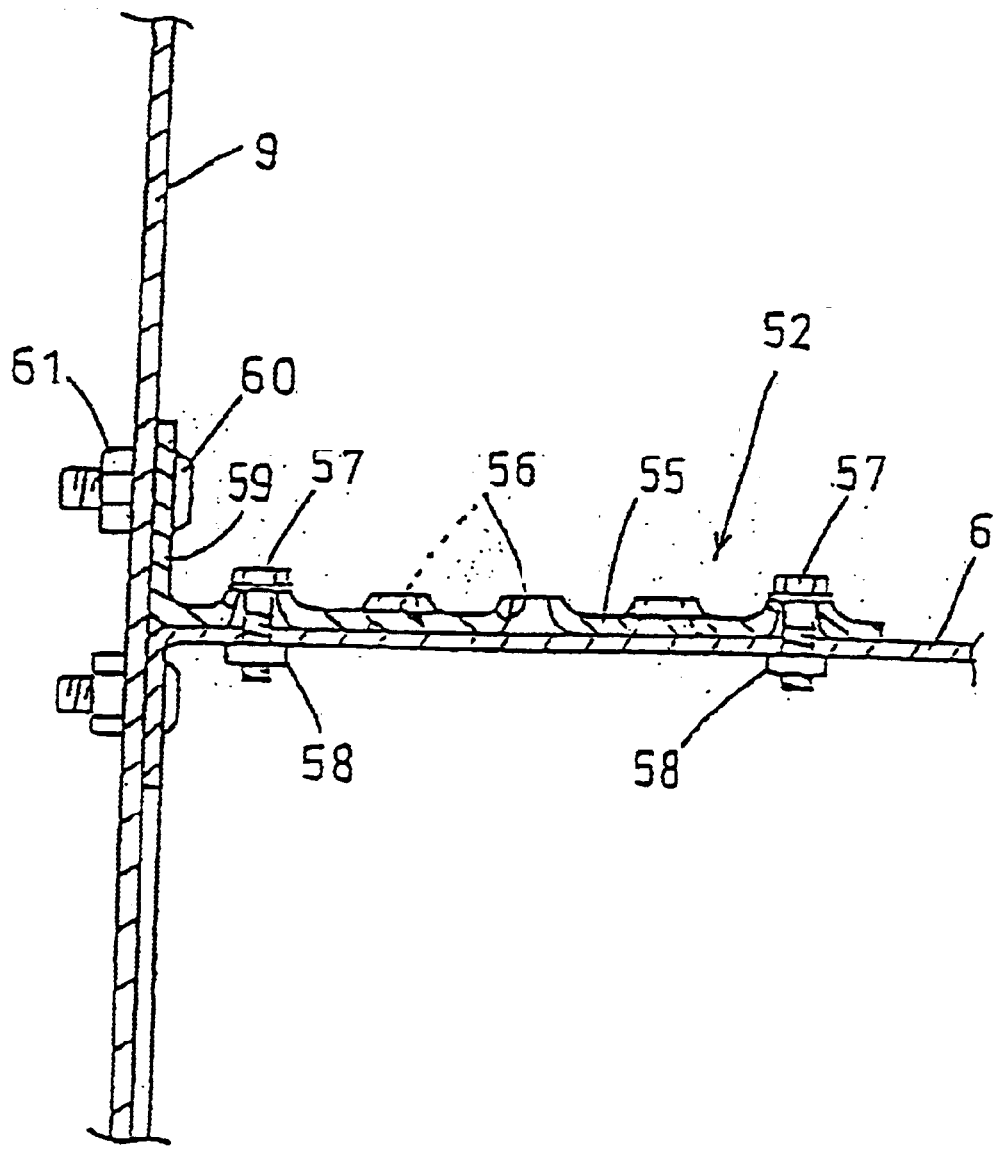
FIG. 5 is a sectional front view of a step member (an enlarged view of portion A of FIG. 3).

This step member 55 is in the form of a metal plate shaped rectangular in plan view. As shown in FIG. 5 also, the step member 55 has numerous bores 56 formed therein, with regions around the bores 56 embossed to perform the antislipping function. Bolts 57 are passed through several of the bores 56 to mesh with nuts 58 under the floor sheet 6, whereby the step member 55 is fixed to the floor sheet 6.

The step member 55 is bent upward at the left end thereof to form a connection piece 59 extending along a side surface of the wheel fender 9. The connecting piece 59 and fender 9 are connected by fastening elements such as bolts 60 and nuts 61. Thus, as does the cover member 53 to the right of driver's seat 8, the step member 55 has a function to reinforce the wheel fender 9 to prevent vibration and the like of the fender 9.

The step member 55 is detachable from the floor sheet 6 and wheel fender 9 after loosening the bolts 57, 60 and nuts 58, 61. When the step member 55 is detached, mud and the like adhering to the step member 55 may be removed therefrom with ease. Further, the step member 55 may be changed easily as necessary.

The step member 55 may be formed of a plate without the bores 56, such as checkered steel plate, or may be an elastic material such as a rubber mat applied to the surface of a metal plate. It is also possible to attach a rubber mat directly to the floor sheet 6.

Further, it is possible to roughen the surface of floor sheet 6 to provide the antislipping function. Such a measure would encumber a mud removing operation and the like. It is therefore preferred that the separate step member 55 is detachably attached to the floor sheet 6.

With the above construction, when driving the tractor 1 to travel from one location to another or performing an operation with the front loader 12, the driver's seat 8 is set to the forward facing position by means of the reversing support device 7, so that the driver may operate the steering wheel 40 and control levers of maneuvering station 43 for controlling the front loader 12.

When making a change from the above operation to an excavating operation with the backhoe, the driver's seat 8 is reversed from the position facing the maneuvering station 43 to the rearward facing position by means of the reversing support device 7.

As described hereinbefore, the plurality of control levers 50 are disposed in a concentrated way to the right of driver's seat 8, allowing a broad passage space to be secured to the left of driver's seat 8. Thus, the driver's seat 8 may be turned with a position of large turning radius of driver's seat 8 (the front of driver's seat 8 in the illustrated example) moving through the passage. In this way, the driver's seat 8 may be prevented from interfering with the control levers 50.

Therefore, the driver's seat 8 may be turned horizontally on the same level between the forward facing position and rearward facing position. Without the mechanism used in the prior art for raising the driver's seat, the simplified structure achieves a reversing operation quickly and easily.

After reversing the driver's seat 8 to the rearward facing position, the driver may move from the maneuvering floor 41 through the passage 52 at the left side of the driver's seat 8 to the step 31 of backhoe 13. Once seated on the driver's seat 8, the driver may operate the control lever 32 of backhoe 13.

Thus, the driver can promptly move on the tractor body 2 toward the backhoe 13 without stepping down to the ground. The trouble of such movement is reduced, and the driver can immediately commence a next operation, thereby realizing improved working efficiency. In addition, since there is a reduced chance of bringing mud from the ground to the tractor body adjacent the backhoe 13, a cleaning operation can be carried out with ease.

The above operation may only be reversed when changing from the operation with the backhoe 13 to an operation for driving the tractor or an operation with the front loader 12.

This invention is not limited to the above embodiment, but may be varied as desired.

For example, the left and right arrangement of the passage and the control levers 50 on the tractor body is not limited to the above embodiment, but may be reversed. The driver's seat 8 is not limited to the reversal of positions through a horizontal rotation. The driver's seat may be detached from the floor sheet 6 and reinstalled in a reversed state thereon. Further, a forward facing driver's seat and a rearward facing driver's seat may be separately used on the tractor body.

The working implement attached to the rear of tractor body 2 is not limited to the backhoe 13, which may be replaced with a different working implement. Moreover, this invention is not limited to the tractor body with the front loader 12 attached to the front thereof, but is applicable where no such front loader is attached.

What is claimed is:

1. A tractor comprising:

a tractor body;

a working implement attached to a rear end of said tractor body;

first and second wheel fenders disposed on right and left lateral sides, respectively, of said tractor body; and a driver's station disposed on said tractor body, said driver's station including:

a tractor control station disposed in a forward region of said driver's station;

an implement control station disposed in a rearward region of said driver's station;

a driver's seat disposed in a central region of said driver's station; and a position switching mechanism for switching said driver's seat between a forward facing position for allowing the driver seated on said driver's seat to operate said tractor control station, and a rearward facing position for allowing the driver to operate said implement control station, wherein when said position switching mechanism switches said driver's seat from said rearward facing position to said forward facing position, a plurality of control levers at least having a lever for propelling said tractor body are located on one lateral side of the driver, while a walk-through passage is defined on an other lateral side of the driver so as to allow the driver having left said implement control station to enter said tractor control station without off-boarding from said tractor body, and when said position switching mechanism switches said driver's seat from said forward facing position to said rearward facing position, said control levers are located on said other lateral side of the driver, while said walk-through passage is defined on said one lateral side of the driver so as to allow the driver having left said tractor control station to enter said implement control station without off-boarding from said tractor.

2. A tractor as defined in claim 1, wherein said walk-through passage includes a step member extending to said second wheel fender.

3. A tractor as defined in claim 1, wherein said driver's seat is horizontally rotatable about a vertical axis to switch between said forward facing position and said rearward facing position, said axis located within said driver's seat in plan view.

4. A tractor as defined in claim 2, wherein said step member has an antislipping function, said step member serving as a reinforcing member for said second wheel fender.

5. A tractor as defined in claim 4, wherein said step member is detachably attached to said walk-through passage.

6. A tractor as defined in claim 4, wherein said step member is detachably attached to said walk-through passage.

7. A tractor as defined in claim 6, wherein said working implement is a backhoe.

8. A tractor as defined in claim 7, wherein said driver's seat is rotatable about a vertical axis to switch between said forward facing position and said rearward facing position, said axis located within said driver's seat in plan view.

9. A tractor as defined in claim 8, wherein said walk-through passage includes a step member reinforcing said second wheel fender.

10. A tractor as defined in claim 9, further including a lower member extending over said control levers and reinforcing said first wheel fender.

11. A tractor as defined in claim 10, wherein said step member is a metal plate with an antislip surface.

12. A tractor as defined in claim 11, wherein said step member is detachably mounted in said walk-through passage.

13. A tractor as defined in claim 12, wherein a front end of said driver's seat moves through said walk-through passage as said driver's seat is moved from said forward facing position to said rearward facing position.

14. A tractor as defined in claim 1, wherein a front end of said driver's seat moves through said walk-through passage as said driver's seat is moved from said forward facing position to said rearward facing position.

15. A tractor comprising:
a tractor body;
a working implement attached to a rear end of said tractor body; and
a driver's station disposed on said tractor body, said driver's station including:
a tractor control station disposed in a forward region of said driver's station;
an implement control station disposed in a rearward region of said driver's station;
a driver's seat disposed in a central region of said driver's station, said driver's seat having a swing axis located within said driver's seat in plan view; and
a position switching mechanism for swinging said driver's seat about said swing axis between a forward facing position for allowing the driver seated on said driver's seat to operate said tractor control station, and a rearward facing position for allowing the driver to operate said implement control station,
wherein when said position switching mechanism swings said driver's seat about said swing axis from said rearward facing position to said forward facing position, a plurality of control levers at least having a lever for propelling said tractor body are located on one lateral side of the driver, while a walk-through passage is defined on an other lateral side of the driver so as to allow the driver having left said implement control station to enter said tractor control station without off-boarding from said tractor body, and
when said position switching mechanism swings said driver's seat about said swing axis from said forward facing position to said rearward facing position, said plurality of control levers are located on said other lateral side of the driver, while said walk-through passage is defined on said one lateral side of the driver so as to allow the driver having left said tractor control station to enter said implement control station without off-boarding from said tractor body.

* * * * *